3,076,044
METHOD OF PREPARING LONG CHAIN
ALKYL CHLORIDES
Gerald C. Bassler, Palo Alto, and Albert F. Stang, Milpitas, Calif., assignors to Armour & Company, Chicago, Ill., a corporation of Delaware
No Drawing. Filed Dec. 30, 1960, Ser. No. 79,562
6 Claims. (Cl. 260—652)

This invention relates to a method of preparing alkyl chlorides, and more particularly to a method of preparing them by the reaction of a chlorinating agent with trialkylaluminums.

It might be assumed that trialkylaluminum compounds, such as tridodecylaluminum, could be reacted with chlorine to produce alkyl chlorides. When this reaction is attempted, however, great difficulties are encountered. The exact nature of the difficulties is not known with certainty, but apparently any alkyl chloride which is formed in the early stages of the reaction becomes involved in alkylation reactions, catalyzed by alkylaluminum halides and/or aluminum chloride, resulting in high-boiling hydrocarbons, thereby making it difficult if not impossible to obtain any measurable yield of the desired product.

It is therefore a principal object of the present invention to provide a method for chlorinating trialkylaluminums wherein alkyl chloride is produced in good yield. Further objects and advantages will be indicated in the following detailed specification.

This invention is based in part on the discovery that the reaction of trialkylaluminums with oxychlorides of sulfur can be advantageously employed to produce long chain alkyl chlorides. Particularly good yields are obtained with sulfuryl chloride ($SO_2Cl_2$) as the chlorinating agent.

In practicing the method of this invention, it is preferred to employ a trialkylaluminum starting material wherein the alkyl groups contain predominately from 6 to 22 carbon atoms. The starting material may be a specific compound such as tridodecylaluminum, or a mixture of trialkylaluminum compounds of different chain lengths. Several procedures are known for preparing such trialkylaluminum compounds or mixtures of such compounds. One such procedure is described in Angew. Chem., vol. 64, pp. 323–327 (1952) ibid. vol. 67, 424 (1955). According to the procedure of this reference, for example, triisobutylaluminum may be reacted with dodecene-1 in normal heptane to produce tridodecylaluminum. Where a starting material having mixed chain lengths is desired, the procedure described in U.S. Patent 2,699,457 can be employed. By reacting triethylaluminum with ethylene under the conditions described in this patent, a growth reaction can be made to occur resulting in a mixture of long chain olefins. The olefins thus obtained or fractions thereof can be used to prepare the desired trialkylaluminums. Instead of ethylene odd carboned terminal olefins may be used. In one embodiment of the present invention, it will be preferred to employ as a starting material a mixture of trialkylaluminums where the alkyl groups contain predominately from 8 to 18 carbon atoms. For example, a typical mixture might contain 10% trioctylaluminum, 16% tridecylaluminum, 18% tridodecylaluminum, 17% tritetradecylaluminum, 14% trihexadecylaluminum, and 10% trioctadecylaluminum.

In carrying out the reaction, the trialkylaluminum should be dissolved in a suitable organic solvent medium, such as the saturated hydrocarbons like n-heptane, that have commonly been used for reactions involving trialkylaluminums. The solvent is preferably substantially inert under the conditions of the reaction, that is, it does not undergo chlorination or decomposition. Since the nature of the solvent is not particularly critical, and the same solvents may be employed which heretofore have been used for analogous reactions, it is not believed that further discussion of the solvent medium is necessary.

In accordance with known procedures for preventing oxidation of trialkylaluminums, the reaction should be carried out under an oxygen-free atmosphere. For example, a nitrogen atmosphere can be used. The reaction procedure itself is not particularly critical. The reaction can be carried out within a closed but vented vessel, the oxychloride of sulfur being introduced into the reaction medium and agitated therein. Sulfuryl chloride ($SO_2Cl_2$) is preferred, but other sulfur oxychlorides can be used, such as thionyl chloride ($SOCl_2$).

Somewhat greater control of the reaction may be obtained by using refrigeration, but ordinary room temperatures may be employed. For example, the reaction may be conducted at temperatures ranging from 0 to 30° C. If desired, however, temperatures below 0° C., may be used, or temperatures above 30° providing that the reaction remains under control and that the reactants are not decomposed. In other words, the temperatures themselves are not critical, but are simply those which would normally be employed for the type of reaction involved.

The method of this invention is further illustrated in the following specific examples.

*Example 1*

Sulfuryl chloride ($SO_2Cl_2$, 0.025 mole) was added to 0.006 mole of tridodecylaluminum in n-heptane solution. The addition was made at 0° C. and required 10 minutes. The product was hydrolyzed with dilute hydrochloric acid following the addition of sulfuryl chloride. The organic portion of the reaction product was analyzed by gas-liquid partition chromatography. This analysis showed that the oily liquid product consisted of n-dodecane and dodecylchloride. The yield of dodecylchloride was 70% of the theoretical yield.

*Example 2*

Thionyl chloride ($SOCl_2$, 0.021 mole) was added to 0.006 mole of tridodecylaluminum in n-heptane solution. The addition required 15 minutes and was made at a temperature of 0° C. The reaction mixture was hydrolyzed with dilute hydrochloric acid following the final addition of thionyl chloride. The oily product of the reaction weighed 4.9 g. Examination of this product via gas-liquid partition chromatography showed that it consisted of n-dodecane and dodecylchloride. The dodecylchloride amounted to at least 20% of the theoretical yield.

*Example 3*

To prepare octadecylchloride, the procedure of Example 1 is followed except that triooctadecylaluminum is substituted for tridodecylaluminum. The desired prouct is obtained in good yield.

While this invention has been described in the foregoing specification in relation to certain specific embodiments thereof and many details have been set forth for purpose of illustration, it will be apparent to those skilled in the art that the invention is susceptible to additional embodiments and that many of the details described herein can be varied without departing from the basic principles of the invention.

We claim:
1. The method of preparing long chain alkyl chlorides, characterized by reacting an oxychloride of sulfur with a trialkylaluminum starting material wherein the alkyl groups contain predominately from 6 to 22 carbon atoms, said oxychloride of sulfur being selected from the class consisting of sulfuryl chloride and thionyl chloride.

2. The method of claim 1 in which said oxychloride of sulfur is sulfuryl chloride.

3. The method of preparing long chain alkyl chlorides, comprising dissolving a trialkylaluminum starting material in an organic solvent medium, said starting material containing alkyl groups having predominately from 6 to 22 carbon atoms, introducing an oxychloride of sulfur into said solvent medium said oxychloride of sulfur being selected from the class consisting of sulfuryl chloride and thionyl chloride, and reacting said oxychloride of sulfur with said trialkylaluminum starting material to obtain the long chain alkyl chlorides.

4. The method of claim 3 in which said oxychloride of sulfur is sulfuryl chloride.

5. The method of preparing long chain alkyl chlorides, comprising forming a reaction mixture composed principally of a trialkylaluminum starting material wherein the alkyl groups contain predominately from 6 to 22 carbon atoms, said starting material being dissolved in a hydrocarbon solvent, introducing an oxychloride of sulfur into said reaction mixture, said oxychloride of sulfur being selected from the class consisting of sulfuryl chloride and thionyl chloride, and reacting said oxychloride of sulfur with said trialkylaluminum starting material.

6. The method of claim 5 in which said oxychloride of sulfur is sulfuryl chloride.

References Cited in the file of this patent
UNITED STATES PATENTS
2,935,536   Averill et al. _____ May 3, 1960